United States Patent [19]

Tsuda et al.

[11] Patent Number: 5,657,666

[45] Date of Patent: Aug. 19, 1997

[54] TRANSMISSION MECHANISM CAPABLE OF SUPPRESSING VIBRATIONAL NOISE

[75] Inventors: Akinori Tsuda, Gose; Touseki Kin, Sakai, both of Japan

[73] Assignee: Minolta Co., Ltd., Osaka, Japan

[21] Appl. No.: 542,630

[22] Filed: Oct. 13, 1995

[30] Foreign Application Priority Data

Oct. 25, 1994 [JP] Japan .................................. 6-283916
Oct. 25, 1994 [JP] Japan .................................. 6-283917

[51] Int. Cl.⁶ .............................. F16H 55/14; F16H 1/02
[52] U.S. Cl. ........................ 74/421 A; 74/443; 248/604; 248/674; 310/51
[58] Field of Search .......................... 74/421 A, 411, 74/443; 384/215, 439; 248/604, 638, 674; 310/51

[56] References Cited

U.S. PATENT DOCUMENTS

| 2,936,141 | 5/1960 | Rapata ................................ 248/604 |
| 3,065,941 | 11/1962 | Loftis ................................. 248/604 |
| 3,361,914 | 1/1968 | Janssen .............................. 310/51 |
| 3,371,549 | 3/1968 | Schrempp .......................... 74/411 |
| 3,385,126 | 5/1968 | Finch ................................ 74/411 X |

FOREIGN PATENT DOCUMENTS

| 58-46286 U | 10/1983 | Japan . |
| 62-12043 U | 1/1987 | Japan . |
| 62-35145 U | 3/1987 | Japan . |
| 62-59357 U | 4/1987 | Japan . |
| 63-19470 | 1/1988 | Japan . |
| 4-194435 | 7/1992 | Japan .................................. 74/421 A |
| 1104332 | 7/1984 | U.S.S.R. ............................. 74/411 |

Primary Examiner—Richard M. Lorence
Attorney, Agent, or Firm—Sidley & Austin

[57] ABSTRACT

A transmission mechanism is capable of effectively attenuating vibrations generated thereby during operation by converting vibrations into heat energy. The base plate is provided with a plurality of flexible connecting ribs and a plurality of substantially sectorial openings formed alternately around a motor base part for holding a motor and bearing parts for supporting the shafts of the gears. Each of the gears has a rim provided on its outer circumference with teeth, a hub and flexible arms connecting the rim to the hub. Vibrations generated by the motor and those generated by the gears strain the flexible connecting ribs of the base plate and the flexible arms of the gears, the strains of the flexible connecting ribs and the flexible arms are converted into heat energy in the end and the heat energy dissipates, so that the variations are attenuated and noise attributable to the vibrations is suppressed.

19 Claims, 9 Drawing Sheets

TRANSMISSION MECHANISM CAPABLE OF SUPPRESSING VIBRATIONAL NOISE

BACKGROUND OF THE INVENTION

1. Field of the Invention

The present invention relates to a transmission mechanism suitable for use on a precision mechanical apparatus, such as a camera, capable of preventing vibrational noise generation and, more particularly, to a base plate for such a transmission mechanism and a gear mechanism that does not generate gear noise, and a method of forming gears for such a gear mechanism.

2. Description of the Prior Art

In a precision mechanical apparatus, such as a camera, a combination of a motor and a transmission mechanism is used for driving the lens or for winding and rewinding the film. When the motor operates, vibrations generated by the motor and those generated by the transmission mechanism for transmitting the output power of the motor are transmitted to the camera body of the camera, and the camera body, in some cases, resonates with the those vibrations and functions as a resonance box to amplify the vibrations and generate noise. Since the noise generated by the motor and the transmission mechanism is generally not very bothersome, measures have not been taken to prevent the noise. However, there has been a problem with the camera, when using the camera for photographing in a silent place such as a concert hall, in that noise generated by the motor and the transmission mechanism of the camera in driving the lens or in winding or rewinding the film spoils the silent atmosphere. Generally, the camera is provided with a plurality of motors and a plurality of transmission mechanisms for driving the lens, winding and rewinding the film, and other purposes. Gear type transmission mechanisms are used most prevalently as such transmission mechanisms. Generally, in the gear type transmission mechanism, the gears generate vibrations due to irregular engagement attributable to eccentricity or pitch errors or due to load variation and the like.

Various measures including molded synthetic resin gears and noiseless gears having elastically deformable teeth have been proposed to suppress vibrations and to prevent noise generation. Japanese Utility Model Publication No. Sho 58-46286 discloses an example proposed for such purposes.

However, the gear having elastically deformable teeth has a complex structure, is difficult to manufacture, and requires a high manufacturing cost.

SUMMARY OF THE INVENTION

Accordingly, a principal object of the present invention is to provide a transmission mechanism capable of preventing the generation of vibrational noise, by absorbing vibrations and converting the same into thermal energy by the flexure of synthetic resin members.

Another object of the present invention is to provide a transmission mechanism including a base plate capable of suppressing vibrations generated by an associated motor and the components of the transmission mechanism to the least possible extent to reduce noise.

A further object of the present invention is to provide a noiseless gear having a simple structure, which is capable of being elastically deformed to suppress noise generation, which has a high mechanical strength, and which is easy to manufacture and inexpensive, and to provide a method of forming such a noiseless gear.

The above and other objects of the present invention will become apparent from the following description taken in connection with the accompanying drawings.

DETAILED DESCRIPTION OF THE PREFERRED EMBODIMENTS

Figure 1:
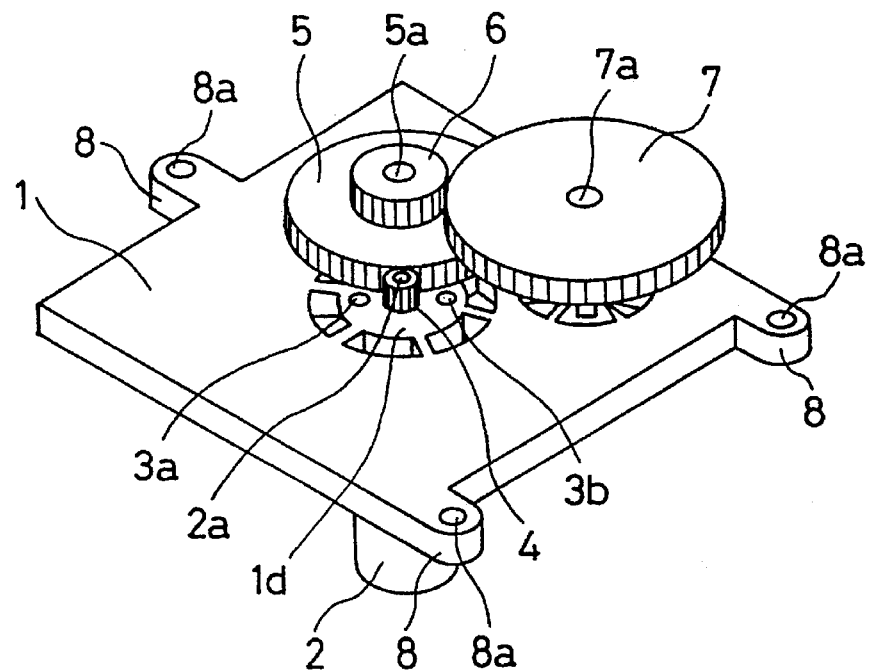
FIG. 1 is a perspective view of a gear type transmission mechanism in a first embodiment according to the present invention.

FIGS. 1 to 6 are perspective views of a gear type transmission mechanism in a first embodiment according to the present invention and its modifications. Referring to FIG. 1 showing the gear type transmission mechanism in the first embodiment, a motor 2 is fastened with screws 3a and 3b from below to the back surface of a motor base part 1d in a base plate 1. A pinion 4 is mounted on the output shaft 5a of the motor 2 so as to be in engagement with a gear 5, which is supported for rotation on the shaft 5a set upright on the base plate 1. A gear 6 coaxially fixed to the gear 5 is in engagement with a gears 7, which is supported for rotation on a shaft 7a set upright on the base plate 1 and interlocked with a lens driving mechanism, not shown, or a film winding/rewinding mechanism, not shown, to transmit power to the lens driving mechanism or the film winding/rewinding mechanism. The base plate 1 is provided with fitting lugs 8 provided with threaded holes 8a, respectively, by which the base plate 1 is attached to an apparatus, such as a camera.

Figure 2:
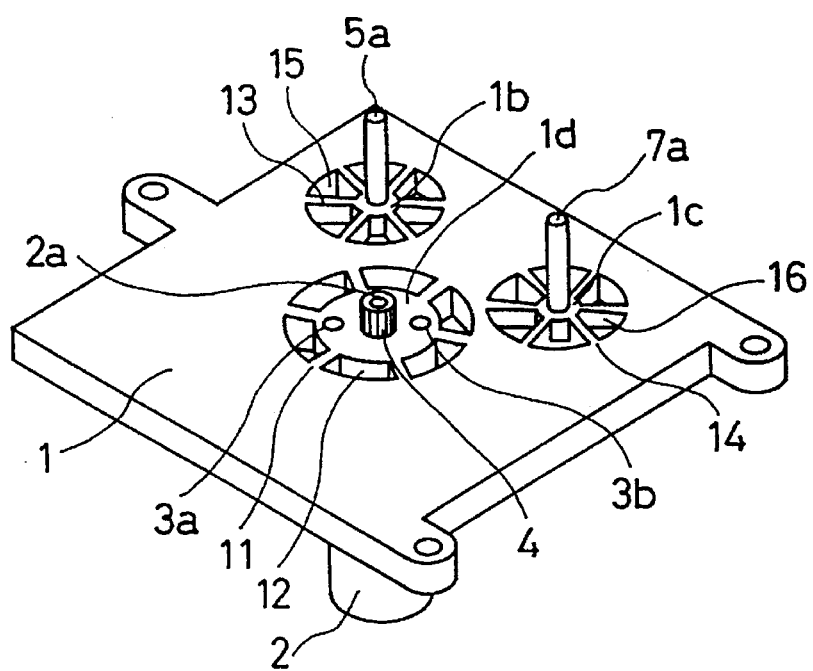
FIG. 2 is a perspective view of a first modification of a base plate included in the gear type transmission mechanism of FIG. 1.

Referring to FIG. 2 showing the base plate 1 of the gear type transmission mechanism of FIG. 1, omitting the gears 5, 6 and 7, a plurality of substantially sectorial openings 12 and a plurality of radial connecting ribs 11 are formed around the motor base part 1d of the base plate 1 around the output shaft 2a of the motor 2.

A plurality of substantially sectorial openings 15 and a plurality of radial connecting ribs 13 are formed around a bearing part 1b holding the shaft 5a for supporting the gears 5 and 6. A plurality of substantially sectorial openings 16 and a plurality of radial connecting ribs 14 are formed around a bearing part 1c holding the shaft 7a supporting the gear 7.

The base plate 1 is formed of a synthetic resin such as a polyamide resin, a polyacetal resin, a polypropylene resin or a polycarbonate resin, by injection molding or transfer molding. The connecting ribs 11, 13 and 14 are formed integrally with the base plate 1.

Vibrations generated by the rotating output shaft 2a of the motor 2 strain the connecting ribs 11, and vibrations generated by the rotation of the meshed gears 5, 6 and 7 strain the connecting ribs 13 and 14. Formed of the synthetic resin, the connecting ribs 11, 13 and 14 are strained by the vibrations to convert the vibrations into heat energy and the heat energy dissipates in the end, so that the vibrations are attenuated effectively.

Generally, the synthetic resin is a viscoelastic material. Since the phase of a stress induced in a viscoelastic material and that of a corresponding strain of the viscoelastic material are different, the stress-strain relation is represented by a hysteresis loop. The area of the hysteresis loop corresponds to an energy loss due to the viscosity of the viscoelastic material, and the stress causing the strain is converted irreversibly into heat energy. Therefore, vibrations generated by the motor 2 and the gears 5, 6 and 7 strain the connecting ribs 11, 13 and 14, and the strained connecting ribs 11, 13 and 14 convert the vibrations into heat energy, and the heat energy dissipates in the end, so that the vibrations are attenuated.

Figure 3:
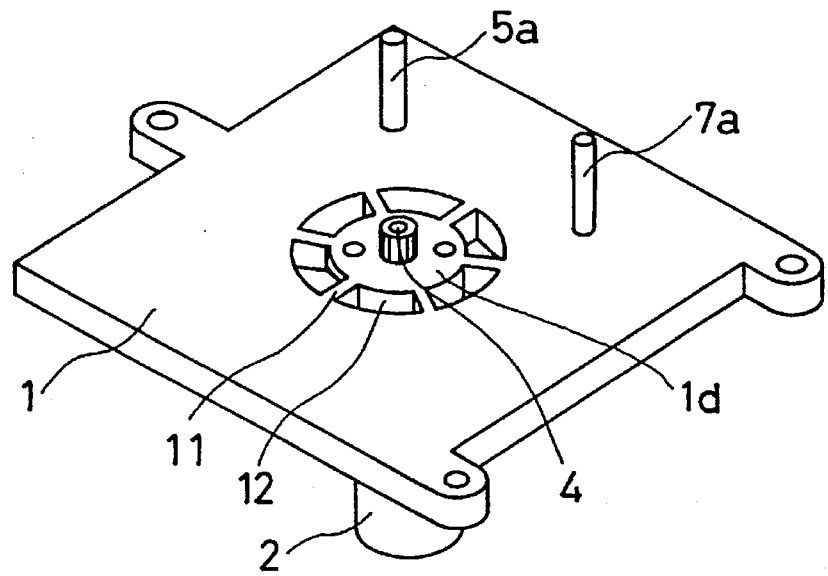
FIG. 3 is a perspective view of a second modification of the base plate of FIG. 1.
Figure 4:
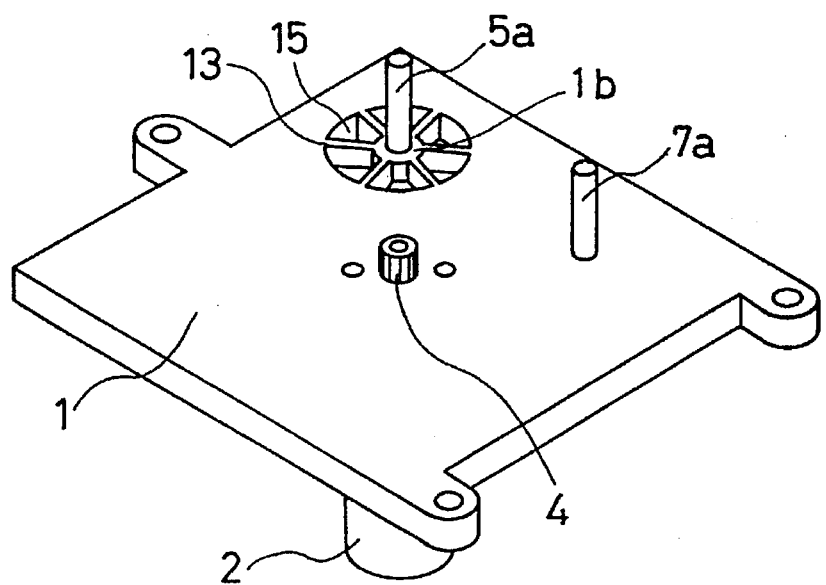
FIG. 4 is a perspective view of a third modification of the base plate of FIG. 1.
Figure 5:
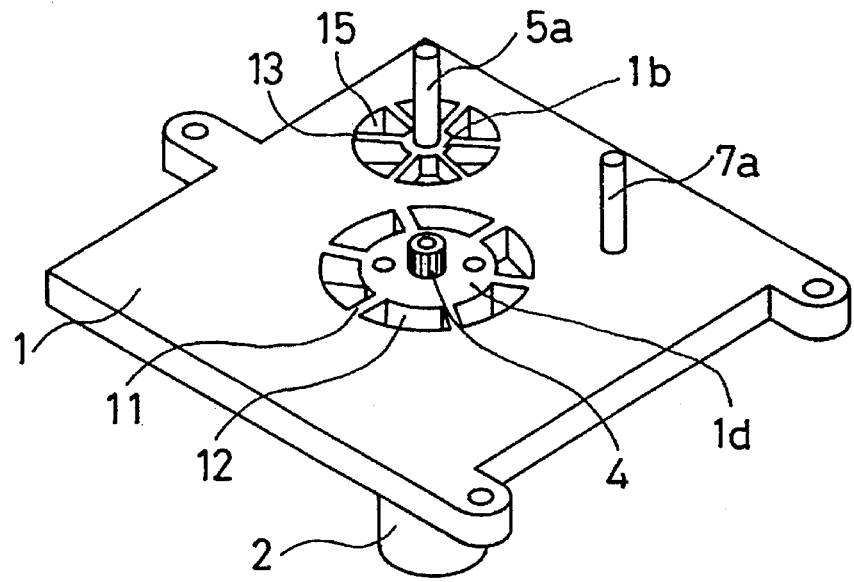
FIG. 5 is a perspective view of a fourth modification of the base plate of FIG. 1.
Figure 6:
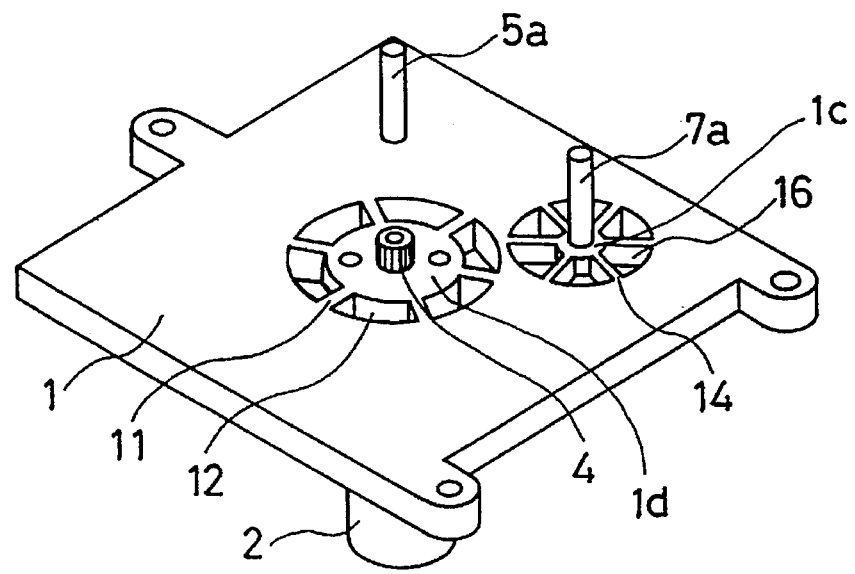
FIG. 6 is a perspective view of a fifth modification of the base plate of FIG. 1.

The substantially sectorial openings need not necessarily be formed in all of the motor base part 1d and the bearing parts 1b and 1c. The substantially sectorial openings may be formed only in the motor base part 1d as shown in FIG. 3, only in the bearing part 1b as shown in FIG. 4, only in the motor base part 1d and the bearing part 1b as shown in FIG. 5 or only in the motor base part 1d and the bearing part 1c as shown in FIG. 6. As shown in FIGS. 2–6, the width of each of the ribs 11, 13, and 14 parallel to the upper face of the base plate 1 is substantially less than the thickness of the ribs parallel to the thickness of the base plate 1.

Generally, the intensity of vibrations generated by a rotating body increases in proportion to the rotating speed of the rotating body. Therefore, satisfactory vibration attenuation and effective noise suppression can be achieved by forming substantially sectorial openings in parts of the base plate 1 in which high-speed members of the gear type transmission mechanism, such as the motor and the shafts of the high-speed gears included in a reduction gear train comprising the pinion 4 and the gears 5, 6, and 7 are supported.

Although the base plate in this embodiment is formed by molding a synthetic resin and is provided integrally with the connecting ribs, it is possible to form the base plate, the motor base part and the bearing parts individually of a metal, and to connect the motor base part and the bearing parts to the base plate by connecting ribs separately formed of a synthetic resin, or to fit a disk shaped motor base part and bearing parts integrally having connecting ribs, provided with substantially sectorial openings and formed of a synthetic resin in openings formed in a metal base plate, respectively. It is also possible to form the base plate by forming substantially sectorial openings, a motor base part and bearing parts by machining a synthetic resin plate.

Figure 7:
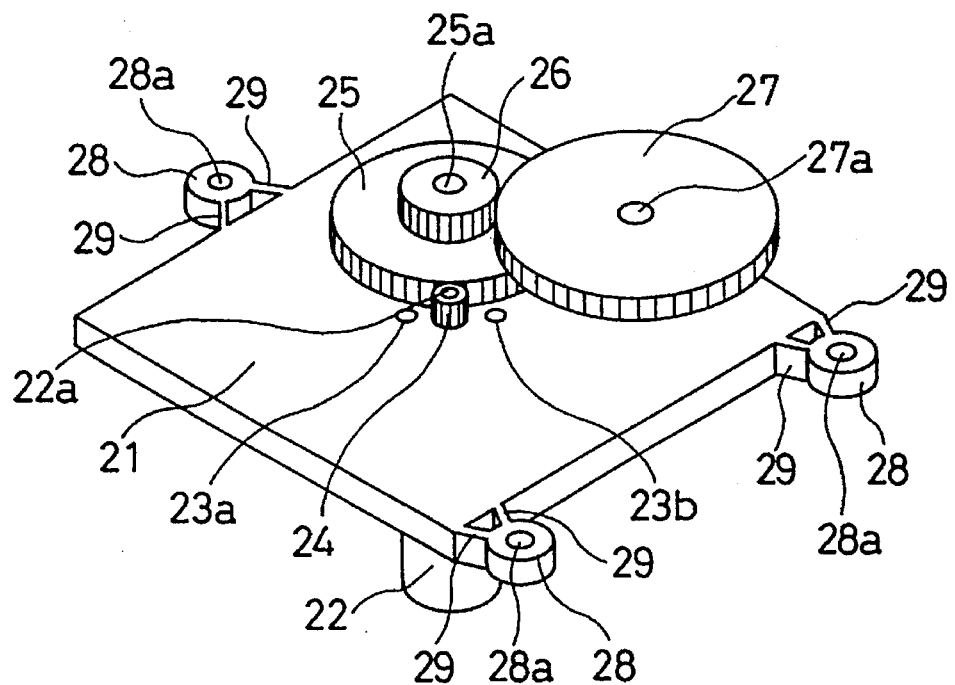
FIG. 7 is a perspective view of a gear type transmission mechanism in a second embodiment according to the present invention.

Referring to FIG. 7 showing a gear type transmission mechanism in a second embodiment according to the present invention in a perspective view, a motor 22 is fastened with screws 23a and 23b from below to the back surface of a base plate 21. A pinion 24 is mounted on the output shaft 22a of the motor 22 so as to be in engagement with a gear 25 supported for rotation on a shaft 25a set upright on the base plate 21. A gear 26, coaxially fixed to the gear 25, is in engagement with a gear 27, which is supported for rotation on a shaft 27a set upright on the base plate 21 and interlocked with a lens driving mechanism, not shown, or a film winding/rewinding mechanism, not shown, to transmit power to the lens driving mechanism or the film winding/rewinding mechanism. The base plate 21 is provided with fitting lugs 28 provided with threaded holes 28a, respectively, by which the base plate 21 is attached to an apparatus. Each of the fitting lugs 28 is connected to the base plate 21 with two thin connecting ribs 29.

Figure 8:
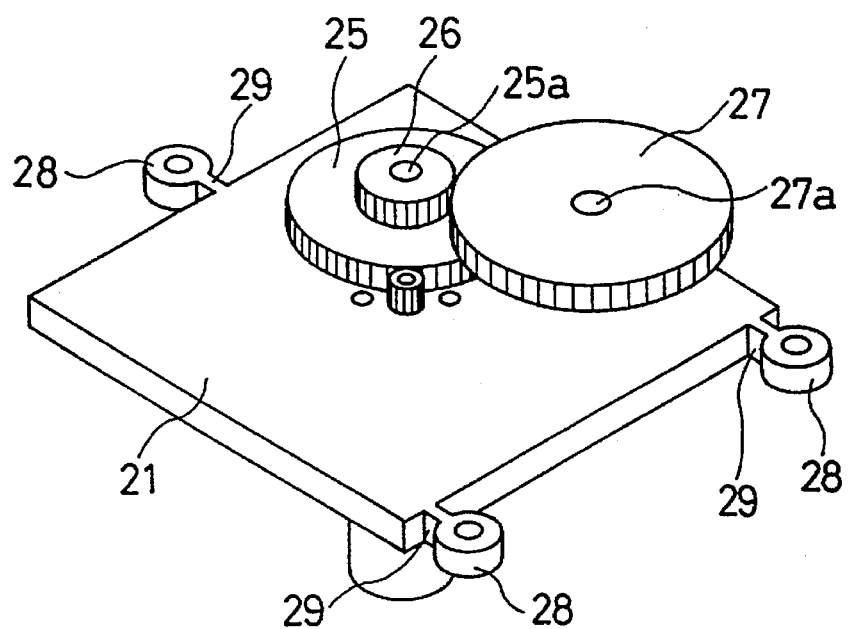
FIG. 8 is a perspective view of a modification of the gear type transmission mechanism of FIG. 7.

In a modification shown in FIG. 8 of the gear type transmission mechanism of FIG. 7, each of the fitting lugs 28 is connected to the base plate 21 with a single connecting rib 29.

In the second embodiment shown in FIG. 7 and the modification shown in FIG. 8 of the second embodiment, the base plate 21 is formed of a synthetic resin such as a polyamide resin, a polyacetal resin, a polypropylene resin or a polycarbonate resin, by injection molding or transfer molding. The fitting lugs 28 and the connecting ribs 29 are formed of a synthetic resin integrally with the base plate 21.

In the second embodiment, vibrations generated by the motor 22 attached to the base plate 21 and those generated by the gear train assembled on the base plate 21 and comprising the pinion 24 and the gears 25, 26 and 27 propagate to the base plate 21 to cause the base plate 21 to vibrate. Then, the thin connecting ribs 29 connecting the fitting lugs 28, to be attached to an apparatus, such as a camera, to the base plate 21 flex to convert the vibrations into heat energy, and the heat energy dissipates in the end, so that the vibrations are attenuated effectively.

Figure 9:
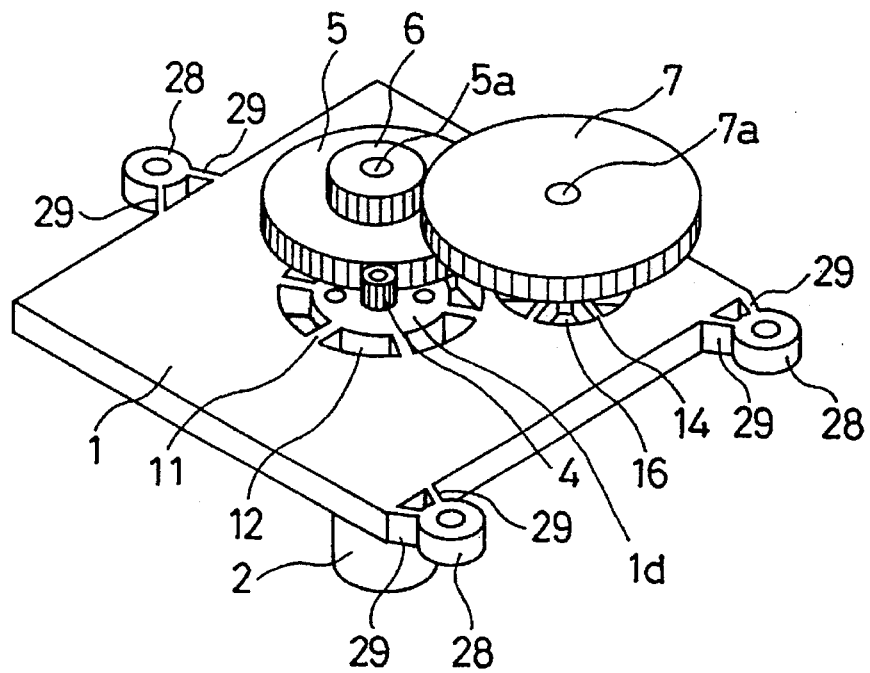
FIG. 9 is a perspective view of a gear type transmission mechanism in a third embodiment according to the present invention.
Figure 10:
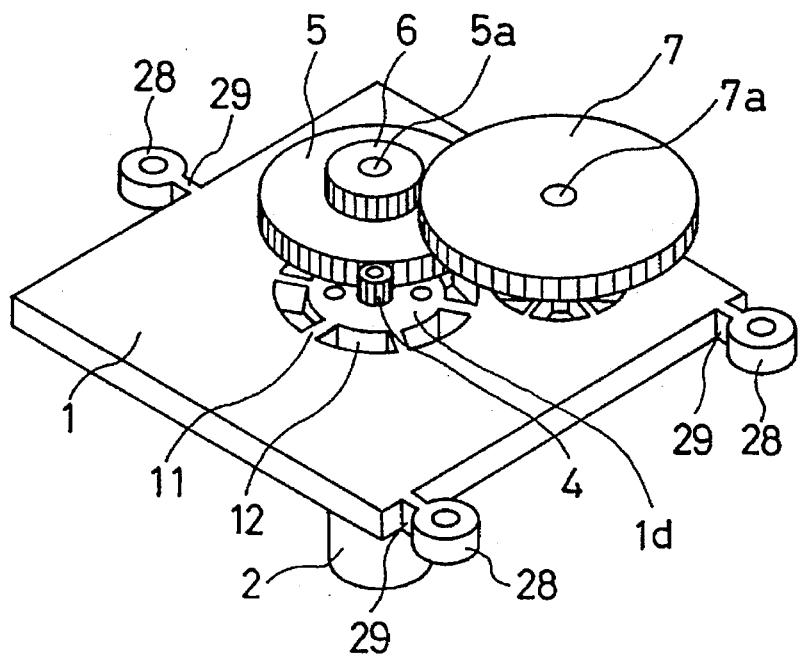
FIG. 10 is a perspective view of a modification of the gear type transmission mechanism of FIG. 9.

FIGS. 9 and 10 show a gear type transmission mechanism in a third embodiment according to the present invention and a modification of the gear type transmission mechanism in the third embodiment, in which parts like or corresponding to those shown in FIGS. 1, 7 and 8 are designated by the same reference characters and the description thereof will be omitted.

As shown in FIG. 9, the gear type transmission in the third embodiment is similar to the gear type transmission mechanism in the first embodiment shown in FIG. 1, except that the gear type transmission mechanism in the third embodiment, similarly to the gear type transmission mechanism in the second embodiment, is provided with fitting lugs 28 each connected to a base plate 1 by two thin connecting ribs 29. As shown in FIG. 10, the modification of the gear type transmission mechanism in the third embodiment shown in FIG. 9 is similar to the gear type transmission mechanism in the first embodiment shown in FIG. 1, except that the modification, similarly to the modification shown in FIG. 8 of the gear type transmission mechanism in the second embodiment, is provided with fitting lugs 28 each connected to a base plate 1 by one thin connecting ribs 29. As shown in FIGS. 7–10, the width of each of the ribs 29, parallel to the upper face of the base plate 21, is substantially less than the thickness of the rib 29 parallel to the thickness of the base plate 21.

Figure 11:
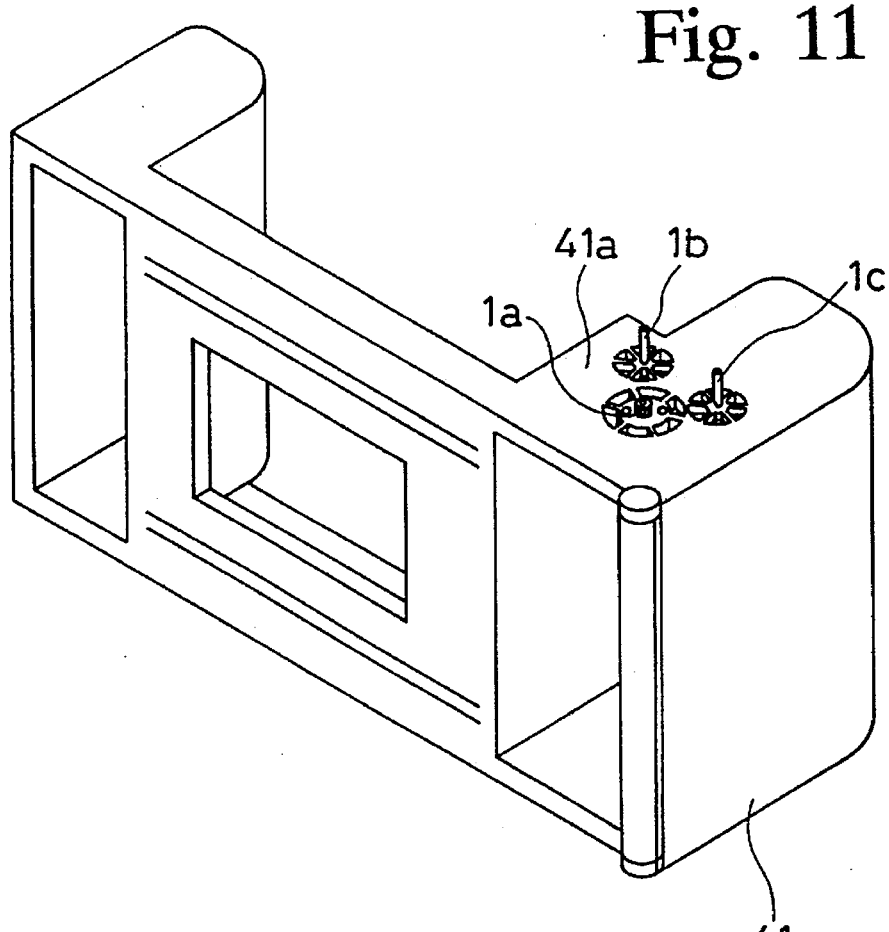
FIG. 11 is a perspective view of a camera body incorporating a base plate in a fourth embodiment according to the present invention.

Referring to FIG. 11, a gear type transmission mechanism in a fourth embodiment according to the present invention is substantially the same as the gear type transmission mechanism in the first embodiment, except that the gear type transmission mechanism in the fourth embodiment employs the upper wall 41a of the synthetic resin body 41 of a camera, into which the same is incorporated, as its base plate.

As shown in FIG. 11, radial connecting ribs and substantially sectorial openings are formed in a motor base part around the output shaft 1a of a motor, and radial connecting ribs and substantially sectorial openings are formed in bearing parts 1band 1c for supporting gears.

Figure 12:
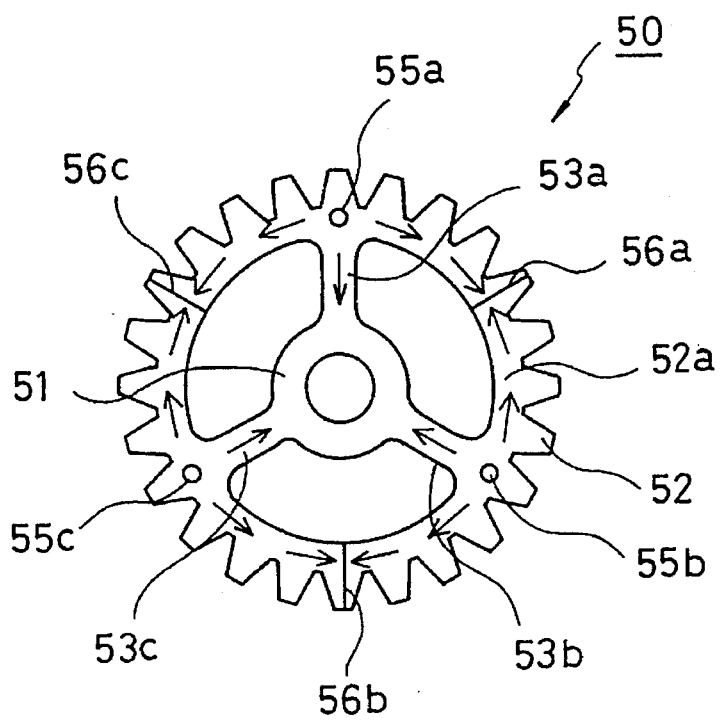
FIG. 12 is a front view of a spur gear embodying the present invention.

Gears employed in the gear type transmission mechanism embodying the present invention will be described hereinafter. Referring to FIG. 12, a spur gear 50 in accordance with the present invention is formed of a synthetic resin by injection molding. The spur gear 50 has a hub 51, teeth 52 formed on a rib 52a, and arms 53a, 53b and 53c radially extending from the hub 51 to the rim 52a.

The flexible synthetic resin arms 53a, 53b and 53c of the gear 50 are flexed by vibrations generated when the teeth 52 thereof come into engagement with those of another gear, the flexed arms 53a, 53b and 53c convert the vibrations into heat energy and the heat energy dissipates, so that the vibrations are attenuated effectively and noise attributable to the vibrations is suppressed.

Generally, the synthetic resin is a viscoelastic material. Since the phase of a stress induced in a viscoelastic material and that of a corresponding strain of the viscoelastic material are different, the stress-strain relation is represented by a hysteresis loop. The area of the hysteresis loop corresponds to an energy loss due to the viscosity of the viscoelastic material, and the stress causing the flexure, i.e., the strain, is converted irreversibly into heat energy. Therefore, the vibrations generated by the meshing gears are converted into the flexure of the arms of the gear, the flexure is converted into heat energy and the heat energy dissipates, so that the vibrations are attenuated and noise attributable to the vibrations is suppressed.

A method of forming the gear 50 by injection molding will be described with reference to FIG. 12. Indicated at 55a, 55b and 55c are the positions of gates formed in a die to inject a molten resin into the die therethrough to form the gear 50. The molten resin injected through the gates into the die flows in the directions of the arrows. Part of the molten resin that flows toward the center forms the hub 51, and part of the molten resin that flows in circumferential directions forms the teeth 52 and the rim 52a.

For example, in FIG. 12, the molten resin injected through the gate at the position 55a into the die and flowed clockwise along the rim 52a and the molten resin injected through the gate at the position 55b into the die and flowed counterclockwise meet at a junction 56a to form part of the rim 52a and some of the teeth 52. Similarly, the molten resin injected through the gate at the position 55a into the die and flowed counterclockwise along the rim 52a and the molten resin injected through the gate at the position 55c into the die and flowed clockwise meet at a junction 56c to form part of the rim 52a and some of the teeth 52, and the molten resin injected through the gate at the position 55b into the die and flowed clockwise along the rim 52a and the molten resin injected through the gate at the position 55c into the die and flowed counterclockwise meet at a junction 56b to form part of the rim 52a and some of the teeth 52. Thus, the molten resin injected through the gates at the positions 55a, 55b and 55c flows in streams in different directions and the streams meet at the junctions 56a, 56b and 56c, respectively to form the teeth 52 and the rim 52a.

Since the streams of the molten resin injected into the die flows through different passages and meet at the junctions 56a, 56b and 56c, and the temperature of the molten resin drops as the molten resin flows through the passages, the junctions 56a, 56b and 56c of the gear 50 have a mechanical strength lower than that of other parts of the gear 50.

Therefore, the present invention forms the junctions 56a, 56b and 56c of the gear 50 in a relatively large sectional area as compared with those of other parts of the gear 50 to enhance the mechanical strength of the junctions 56a, 56b and 56c. In this example, the gates are formed at positions 55a, 55b and 55c so as to place each of the junctions 56a, 56b and 56c on the center line of a tooth 52 as shown in FIG. 12.

Generally, the number of arms of a gear, and the number and the positions of gates are determined so that streams of molten resin injected through the gates into the die meet at junctions respectively corresponding to the teeth of the gear on the basis of the flow of the molten resin in the die estimated from the construction of the die.

Figure 13A:
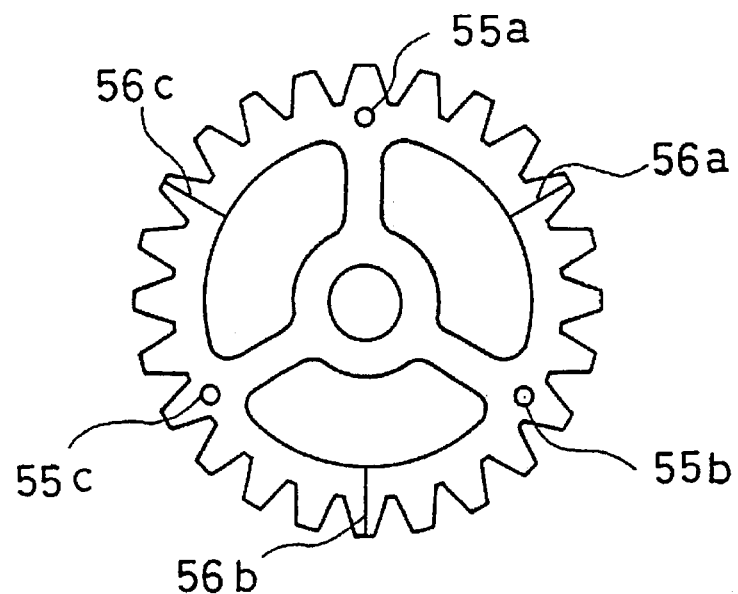
FIGS. 13(a), 13(b) and 13(c) are views of assistance in explaining the relation between the number of gates formed at positions on a die corresponding to positions on the rim of a gear, and the positions and the number of junctions.
Figure 13B:
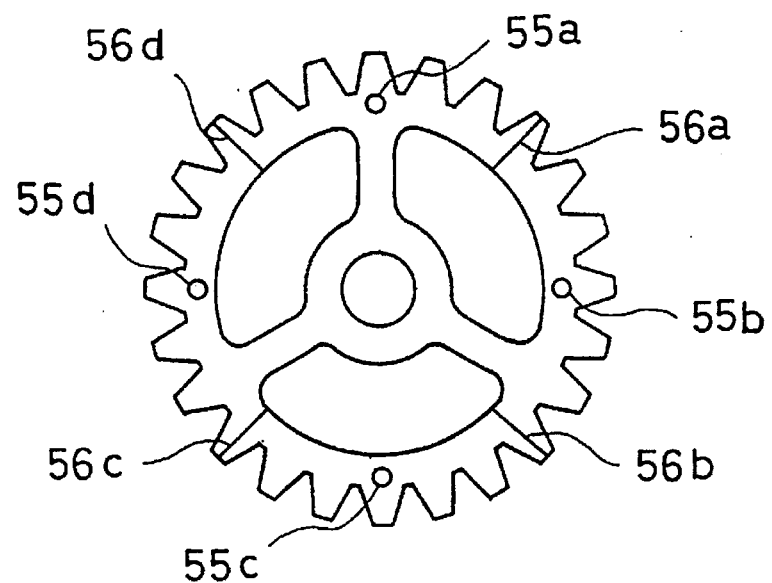
Figure 13C:
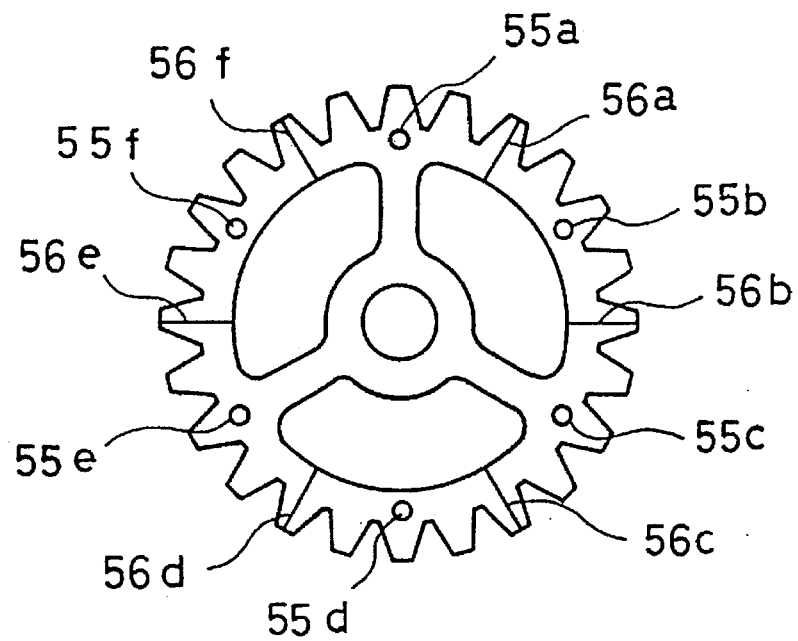

FIGS. 13(a), 13(b) and 13(c) show the number and the positions of junctions dependent on the number of the gates when the gates are formed at positions in a die corresponding to positions on the rim of a gear provided with three arms.

Three junctions 56a, 56b and 56b are formed when three gates are formed at positions 55a, 55b and 55c as shown in FIG. 13(a), four junctions 56a, 56b, 56c and 56d are formed when four gates are formed at positions 55a, 55b, 55c and 55d as shown in FIG. 13(b), and six junctions 56a, 56b, 56c, 56d, 56e and 56f are formed when six gates are formed at positions 55a, 55b, 55c, 55d, 55e and 55f as shown in FIG. 13(c).

Figure 14A:
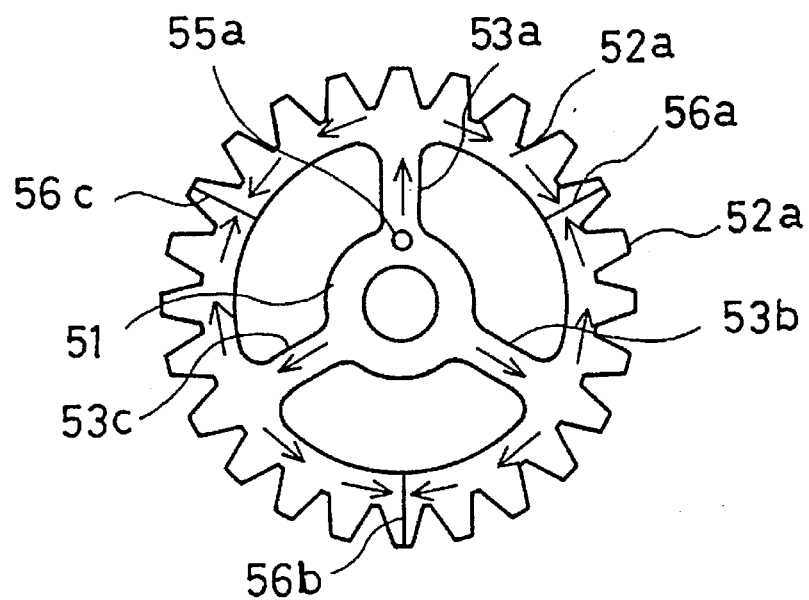
FIGS. 14(a), 14(b) and 14(c) are views of assistance in explaining the relation between the number of arms of a gear, and the positions and the number of junctions when gates are formed at positions on a die corresponding to positions on the hub of the gear.
Figure 14B:
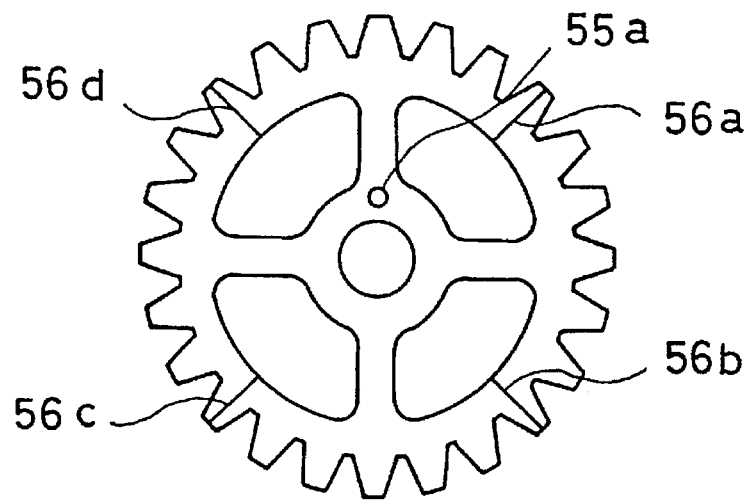
Figure 14C:
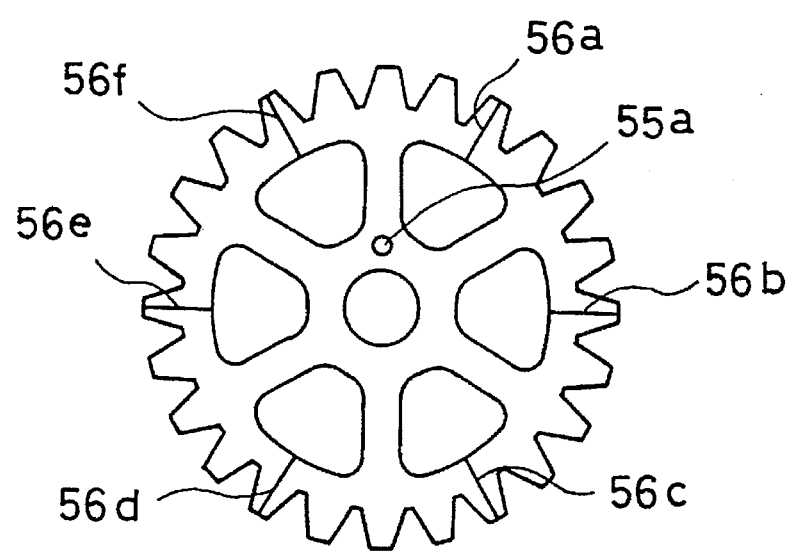

FIGS. 14(a), 14(b) and 14(c) show the number and the positions of junctions dependent on the number of arms of a gear when one gate 55a is formed at a position in a die corresponding to a position on the hub of a gear. As shown in FIG. 14(a), when the gear is provided with three arms 53a, 53b and 53c, a molten resin injected through a gate 55a into the die fills up part of the cavity of the die corresponding to a hub 51 first, then fills up part of the cavity corresponding to arms 53a, 53b and 53c, and then flows in the directions of the arrows to fill up part of the cavity corresponding to teeth 52 and a rim 52a, so that three junctions 56a, 56b and 56c are formed.

Four junctions 56a, 56b, 56c and 56d are formed as shown in FIG. 14(b) when the gear has four arms. Six junctions 56a, 56b, 56c, 56d, 56e and 56f are formed as shown in FIG. 14(c) when the gear has six arms. In either case, the molten resin injected through the gate 55a into the die fills up part of the cavity of the die corresponding to the hub 51 first, then fills up part of the cavity corresponding to the arms, and then the fills up part of the cavity corresponding to the teeth and the rim. Since each junction is formed at a position where streams of the molten resin flowed through parts of the cavity corresponding to the adjacent arms and along part of the cavity corresponding to the rim in opposite directions meet each other in either case, each junction is formed at a position at substantially equal distances from the adjacent arms, respectively.

The gear 50 is formed of a synthetic resin such as a polyamide resin, a polyacetal resin, a polypropylene resin or polycarbonate resin, by injection molding or transfer molding.

The following Table 1 shows the elastic modulus (kgf/cm$^2$) of representative materials suitable for forming the base plate and the gears.

TABLE 1

| Resin | Elastic Modulus |
| --- | --- |
| Polyamide resin | 1.0 to 1.4 ($\times 10^4$ kgf/cm$^2$) |
| Polypropylene resin | 1.5 to 2.1 ($\times 10^4$ kgf/cm$^2$) |
| Polyacetal resin | 2.6 to 3.0 ($\times 10^4$ kgf/cm$^2$) |
| Polycarbonate resin | 2.2 to 2.5 ($\times 10^4$ kgf/cm$^2$) |
| Glass-reinforced polyacetal resin | 8.0 to 9.0 ($\times 10^4$ kgf/cm$^2$) |

The material forming the base plate can be a synthetic resin having an elastic modulus in the range of $1.0\times10^4$ to $9.0\times10^4$ kgf/cm$^2$ or a fiber-reinforced synthetic resin having an elastic modulus in the range of $1.0\times10^4$ to $9.0\times10^4$ kgf/cm$^2$. In particular, the material forming the base plate can be a polyamide resin, a polypropylene resin, a polyacetal resin, a polycarbonate resin, or the like, or such material can be a fiber-reinforced polyamide resin, a fiber-reinforced polypropylene resin, a fiber-reinforced polyacetal resin, a fiber-reinforced polycarbonate resin, or the like.

As is apparent from the foregoing description, in the transmission mechanism in accordance with the present invention, the motor base part to which the motor is attached and the bearing parts supporting the components of the gear train driven by the motor are connected to the base plate by the elastic synthetic resin connecting ribs and, in some embodiments, the fitting lugs by which the base plate is attached to an apparatus are connected to the base plate by the elastic synthetic resin connecting ribs. Therefore, vibrations generated by the operating motor and those generated by the gear train driven by the motor are converted into the flexure of the flexible synthetic resin connecting ribs, the flexure is converted into heat energy and the heat energy dissipates, so that the vibrations are attenuated and noise due to the vibrations is suppressed.

Formed of a synthetic resin, the arms of the gears are flexed by vibrations generated when the teeth of the meshing gears come into engagement, and the flexure of the arms is converted into heat energy in the end and the heat energy dissipates, so that the vibrations are attenuated effectively and noise is suppressed. Since the number of arms of the gears and the number and positions of gates of the die are determined so that the junctions of streams of the molten resin injected through the gates into the die flow different passages, respectively, and meet at positions each on the center line of one of the teeth of the gears, the gears have a comparatively high mechanical strength. The synthetic resin gears of the present invention can be manufactured by injection molding or the like at a high productivity and at a comparatively low manufacturing cost.

As many apparently different embodiments of this invention may be made without departing from the spirit and scope thereof, it is to be understood that the invention is not limited to the specific embodiments thereof except as defined in the appended claims.

What is claimed is:

1. A transmission mechanism comprising:

a motor having an output shaft;

a gear train driven by the output shaft of the motor, said gear train having a plurality of gears and gear shafts for the gears; and a base plate supporting the motor and the gear train, said base plate having a main part, a motor base part to which the motor is attached, and bearing parts, each of the bearing parts supporting a respective one of the gear shafts for the gears of the gear train;

said base plate having an elastic modulus in the range of $1.0\times10^4$ to $9.0\times10^4$ kgf/cm$^2$, said base plate comprising a synthetic resin;

said motor base part being connected to the main part of the base plate by flexible synthetic resin connecting members, and each of said bearing parts being connected to the main part of the base plate by flexible synthetic resin connecting members;

said plurality of gears including a pinion, mounted on the output shaft of the motor, and component gears; and the component gears of the gear train including flexible gears, each of said flexible gears being supported for rotation on a gear shaft set on a respective bearing part connected to the base plate by flexible synthetic resin connecting members, and each of said flexible gears having a rim provided on its outer circumference with teeth, a hub, and flexible synthetic resin arms connecting the rim to the hub;

each of said flexible gears having an elastic modulus in the range of $1.0\times10^4$ to $9.0\times10^4$ kgf/cm$^2$, each of said flexible gears comprising a synthetic resin.

2. A transmission mechanism according to claim 1, wherein each of the synthetic resin of said base plate and the synthetic resin of said flexible gears comprises a polyamide resin, a polypropylene resin, a polyacetal resin, or a polycarbonate resin.

3. A transmission mechanism according to claim 1, wherein at least one of said base plate and said flexible gears is formed of a fiber-reinforced synthetic resin.

4. A transmission mechanism according to claim 3, wherein the fiber-reinforced synthetic resin comprises a polyamide resin, a polypropylene resin, a polyacetal resin, or a polycarbonate resin.

5. A transmission mechanism according to claim 1, wherein each of the flexible synthetic resin connecting members connecting at least one of the motor base part and the bearing parts to the base plate is in the form of a rib having a width parallel to an upper face of the base plate, which width is substantially less than a thickness of the rib parallel to a thickness of the base plate.

6. A base plate suitable for use in a transmission mechanism to support a motor and a gear train, the gear train comprising a plurality of gears and gear shafts for supporting the gears, said base plate being capable of suppressing vibrational noise, said base plate comprising;

a main part;

a motor base part for holding the motor;

bearing parts for supporting the gear shafts for supporting gears of the gear train for rotation; and flexible synthetic resin connecting members connecting the motor base part to the main part of the base plate, and flexible synthetic resin connecting members connecting each respective one of the bearing parts to the main part of the base plate;

said base plate having an elastic modulus in the range of $10 \times 10^4$ to $9.0 \times 10^4$ kgf/cm$^2$ said base plate comprising a synthetic resin.

7. A base plate according to claim 6, wherein the flexible synthetic resin connecting members connecting the motor base part to the main part of the base plate have the shape of a plurality of radial ribs and a plurality of openings arranged alternately around the motor base part.

8. A base plate according to claim 6, wherein the flexible synthetic resin connecting members connecting a respective one of the bearing parts to the main part of the base plate have the shape of a plurality of radial ribs and a plurality of openings arranged alternately around each of the bearing part.

9. A base plate according to claim 6, further comprising fitting members by which the base plate can be attached to an external apparatus, each of the fitting members being connected to the base plate by flexible synthetic resin connecting members.

10. A base plate according to claim 9, wherein each of the flexible synthetic resin connecting members connecting a fitting member to the base plate has a shape of a rib.

11. A base plate according to claim 9, wherein each flexible synthetic resin connecting member connecting a fitting member to the base plate is in the form of a rib having a width parallel to an upper face of the base plate, which width is substantially less than a thickness of the rib parallel to a thickness of the base plate.

12. A base plate according to claim 6, wherein said synthetic resin comprises at least one of a polyamide resin, a polypropylene resin, a polyacetal resin, and a polycarbonate resin.

13. A base plate according to claim 6, wherein said base plate is formed of a fiber-reinforced synthetic resin.

14. A base plate according to claim 13, wherein the fiber-reinforced synthetic resin comprises a polyamide resin, a polypropylene resin, a polyacetal resin, or a polycarbonate resin.

15. A base plate according to claim 6, wherein each of the flexible synthetic resin connecting members of the base plate is in the form of a rib having a width parallel to an upper face of the base plate, which width is substantially less than a thickness of the rib parallel to a thickness of the base plate.

16. A gear suitable for use in a transmission mechanism, said gear being capable of suppressing vibrational noise, said gear comprising:

a rim provided on its outer circumference with teeth;

a hub; and a plurality of flexible arms connecting the rim to the hub;

said gear comprising a synthetic resin material, said gear having an elastic modulus in the range of $1.0 \times 10^4$ to $9.0 \times 10^4$ kgf/cm$^2$ so that said flexible arms are capable of flexing to absorb shocks that act thereon when the teeth of said gear engage teeth of another gear.

17. A gear according to claim 16, wherein the synthetic resin material comprises at least one of a polyamide resin, a polypropylene resin, a polyacetal resin, and a polycarbonate resin.

18. A gear according to claim 16, wherein said gear is formed of a fiber-reinforced synthetic resin material.

19. A gear according to claim 18, wherein the fiber-reinforced synthetic resin material comprises at least one of a polyamide resin, a polypropylene resin, a polyacetal resin, and a polycarbonate resin.

* * * * *